(12) United States Patent
Nagatsuka

(10) Patent No.: US 12,422,695 B2
(45) Date of Patent: Sep. 23, 2025

(54) SPECTACLE LENS

(71) Applicant: HOYA LENS THAILAND LTD., Pathumthani (TH)

(72) Inventor: Susumu Nagatsuka, Tokyo (JP)

(73) Assignee: HOYA LENS THAILAND LTD., Patumthani (TH)

( * ) Notice: Subject to any disclaimer, the term of this patent is extended or adjusted under 35 U.S.C. 154(b) by 727 days.

(21) Appl. No.: 17/280,013

(22) PCT Filed: Sep. 27, 2019

(86) PCT No.: PCT/JP2019/038103
§ 371 (c)(1),
(2) Date: Mar. 25, 2021

(87) PCT Pub. No.: WO2020/067409
PCT Pub. Date: Apr. 2, 2020

(65) Prior Publication Data
US 2021/0397022 A1      Dec. 23, 2021

(30) Foreign Application Priority Data

Sep. 28, 2018   (JP) .................. 2018-184884

(51) Int. Cl.
G02C 7/02         (2006.01)
G02C 7/10         (2006.01)
G02B 1/18         (2015.01)

(52) U.S. Cl.
CPC ............ *G02C 7/024* (2013.01); *G02C 7/102* (2013.01); *G02C 7/104* (2013.01); *G02B 1/18* (2015.01)

(58) Field of Classification Search
CPC .......... G02C 7/10; G02C 7/024; G02C 7/102; G02C 7/104; G02C 7/107; G02C 7/028;
(Continued)

(56) References Cited

U.S. PATENT DOCUMENTS 8,534,833 B2    9/2013  Pophillat et al.
2015/0241602 A1* 8/2015  Avetisian, Sr. ........ G02B 1/116
                                                  359/359

(Continued)

FOREIGN PATENT DOCUMENTS

JP      2014203063 A    10/2014
JP      2015161731 A     9/2015

(Continued)

OTHER PUBLICATIONS

English language machine trnslation of Nishinoiri JP2015161731A (Year: 2015).*

(Continued)

*Primary Examiner* — Marin Pichler
(74) *Attorney, Agent, or Firm* — Sughrue Mion, PLLC

(57) ABSTRACT

Provided is a spectacle lens including multilayer films on an object-side surface and an eyeball-side surface of a lens substrate, in which a reduction ratio of light in a wavelength band of 800 to 1400 nm in the spectacle lens is 45.0% or more, a ratio of a mean reflectance on the eyeball-side surface of the spectacle lens to a mean reflectance on the object-side surface of the spectacle lens is 0.2 to 0.8 in the wavelength band, and a mean reflectance on the eyeball-side surface in a wavelength band of 315 to 400 nm is 5.0% or less.

18 Claims, 2 Drawing Sheets

(58) Field of Classification Search
CPC ........ G02B 1/14; G02B 1/1618; G02B 5/281;
G02B 5/282; G02B 5/283; G02B 5/285;
G02B 5/26; G02B 5/28; G02B 5/287
USPC .. 359/351, 159.6, 159.62, 159.65, 359, 356,
359/361, 580, 581, 584, 586, 588, 589,
359/590, 722; 351/351, 159.6, 159.62,
351/159.65, 359, 356, 361, 580, 581, 584,
351/586, 588, 589, 590, 722
See application file for complete search history.

(56) References Cited

U.S. PATENT DOCUMENTS

| | | |
|---|---|---|
| 2016/0306194 A1 | 10/2016 | Takahashi |
| 2017/0003520 A1 | 1/2017 | Iwasaki et al. |
| 2017/0075144 A1 | 3/2017 | Matsui et al. |
| 2017/0299896 A1 | 10/2017 | Ogo et al. |

FOREIGN PATENT DOCUMENTS

| | | |
|---|---|---|
| WO | 2015080160 A1 | 6/2015 |
| WO | 2015137282 A1 | 9/2015 |
| WO | 2016088763 A1 | 6/2016 |
| WO | 2016089695 A1 | 6/2016 |
| WO | 2018029251 A1 | 2/2018 |

OTHER PUBLICATIONS

PCT/JP2019/038103, "International Preliminary Report on Patentability", Apr. 8, 2021, 7 pages.

EP19866140.7, "Extended European Search Report", May 30, 2022, 8 pages.

PCT/JP2019/038103, English Translation of International Search Report, Nov. 26, 2019, 2 pages.

* cited by examiner

SPECTACLE LENS

CROSS-REFERENCE TO RELATED APPLICATIONS

This application is the National Stage of International Application No. PCT/JP2019/038103, filed on Sep. 27, 2019, which claims priority to Japanese Patent Application No. 2018-184884, filed Sep. 28, 2018, and the contents of which is incorporated by reference.

TECHNICAL FIELD

The present disclosure relates to a spectacle lens.

BACKGROUND ART

Patent Literature 1 describes a spectacle lens that reduces a burden on the eye due to infrared rays contained in sunlight ([0006] of Patent Literature 1). Patent Literature 1 describes that a reflectance of a multilayer film formed on a surface of a lens substrate is set in consideration of the strength of sunlight infrared rays in each wavelength region ([0040] of Patent Literature 1).

Patent Literature 2 describes that by inclusion of a near-infrared ray cut function filter in a lens portion, spectacle that prevent invasion of near-infrared rays into the eyeball as much as possible and are soft on the eye are provided ([0017] of Patent Literature 2).

The near-infrared ray cut function filter described in Patent Literature 2 blocks near infrared rays in a short wavelength region among near infrared rays having a wavelength range of 770 to 1800 nm with a first multilayer film formed on one surface of a transparent substrate (lens substrate). In addition, the near-infrared ray cut function filter blocks near-infrared rays in a long wavelength region with a second multilayer film formed on the other surface ([0013] of Patent Literature 2).

That is, in Patent Literature 2, light blocking is shared by both surfaces with a near-infrared wavelength of 1400 nm as a boundary ([0021] of Patent Literature 2).

CITATION LIST

Patent Literature

Patent Literature 1: WO 2015/080160
Patent Literature 2: JP 2014-203063 A

SUMMARY OF DISCLOSURE

Technical Problem

There is a demand for imparting, to an eyeball-side surface of a spectacle lens, not only a near-infrared reduction function (hereinafter also referred to as IR cut function) but also a function of suppressing reflection of ultraviolet light on the eyeball-side surface (hereinafter, also referred to as low UV reflection) such that ultraviolet light incident from the eyeball-side surface side does not enter the eye of a wearer by reflection.

An aspect of an embodiment of the present disclosure is to ensure IR cut function and low UV reflection on an eyeball-side surface.

Solution to Problem

The present inventor made intensive studies in order to solve the above problems. As a result, the present inventor has found that while IR cut function is imparted to multilayer films on both surfaces, the height of IR cut function is intentionally reduced by one step in a multilayer film on an eyeball-side surface, and low UV reflection is imparted to the multilayer film on the eyeball-side surface.

The present inventor has found that the above problems can be solved by the above configuration.

The present disclosure has been found based on the above findings.

A first aspect of the present disclosure is
a spectacle lens including multilayer films on an object-side surface and an eyeball-side surface of a lens substrate, in which
a reduction ratio of light in a wavelength band of 800 to 1400 nm in the spectacle lens is 45.0% or more,
a ratio of a mean reflectance on the eyeball-side surface of the spectacle lens to a mean reflectance on the object-side surface of the spectacle lens is 0.2 to 0.8 in the wavelength band, and
a mean reflectance on the eyeball-side surface in a wavelength band of 315 to 400 nm is 5.0% or less.

A second aspect of the present disclosure is the aspect according to the first aspect, in which
the ratio of the mean reflectance is less than 0.6.

A third aspect of the present disclosure is the aspect according to the first or second aspect, in which
the reflectance on each surface of the spectacle lens has at least one maximum value in the wavelength band of 800 to 1400 nm.

A fourth aspect of the present disclosure is the aspect according to any one of the first to third aspects, in which
the reflectance on each surface of the spectacle lens has at least one maximum value in a wavelength band of 500 to 570 nm.

A fifth aspect of the present disclosure is the aspect according to the fourth aspect, in which
the largest maximum value in the wavelength band of 500 to 570 nm is more than 1.5%.

A sixth aspect of the present disclosure is the aspect according to any one of the first to fifth aspects, in which
the mean reflectance on the eyeball-side surface of the spectacle lens in a wavelength band of 315 to 380 nm is 5.0% or less.

A seventh aspect of the present disclosure is the aspect according to any one of the first to sixth aspects, in which
the mean reflectance on the object-side surface of the spectacle lens in a wavelength band of 315 to 380 nm is 30.0% or more.

An eighth aspect of the present disclosure is the aspect according to any one of the first to seventh aspect, in which
the mean reflectance on the object-side surface of the spectacle lens in a wavelength band of 280 to 315 nm is 50.0% or more.

A ninth aspect of the present disclosure is the aspect according to any one of the first to eighth aspects, in which
a multilayer film on each surface of the spectacle lens includes one or more high refractive index layers and one or more low refractive index layers, and the total number of layers is 9 or less.

A tenth aspect of the present disclosure is the aspect according to any one of the first to ninth aspects, in which
a luminous reflectance on each surface of the spectacle lens is 3.0% or less.

Other aspects that can be combined with the above aspects are listed below.

An eleventh aspect of the present disclosure is the aspect according to any one of the first to tenth aspects, in which in the wavelength band of 800 to 1400 nm, a ratio of the mean reflectance on the eyeball-side surface of the spectacle lens to the mean reflectance on the object-side surface of the spectacle lens is set to preferably 0.3, more preferably 0.4 as a lower limit, and is set to preferably 0.6 as an upper limit.

A twelfth aspect of the present disclosure is the aspect according to any one of the first to eleventh aspects, in which the mean reflectance on the eyeball-side surface in a wavelength band of 315 to 400 nm is less than 5.0%, and preferably 4.5% or less.

A thirteenth aspect of the present disclosure is the aspect according to any one of the first to twelfth aspects, in which at least one maximum value (largest maximum value when there is a plurality of maximum values) in the wavelength band of 500 to 570 nm is preferably 1.5% or more.

A fourteenth aspect of the present disclosure is the aspect according to any one of the first to thirteenth aspects, in which the sum of the luminous reflectances on both surfaces of the spectacle lens is preferably less than 3.0%, more preferably 2.5% or less, and still more preferably 2.0% or less.

A fifteenth aspect of the present disclosure is the aspect according to any one of the first to fourteenth aspects, in which the luminous reflectance on each surface is preferably 1.1% or less, and more preferably 1.0% or less.

A sixteenth aspect of the present disclosure is the aspect according to any one of the first to fifteenth aspects, in which the sum of the luminous reflectances on both surfaces of the spectacle lens is 3.0% or less, and one maximum value (largest maximum value) in the wavelength band of 500 to 570 nm is preferably more than 1.5%.

A seventeenth aspect of the present disclosure is the aspect according to any one of the first to sixteenth aspects, in which when a running mean of reflectances at 10 points before and after predetermined point a (that is, 21 points in total including point a) in plots between wavelength (horizontal axis) and reflectance (vertical axis) is taken, and the plots are smoothed by using the running mean value as a new reflectance at point a, the reflectance on each surface of the spectacle lens preferably has at least one maximum value in at least one of a wavelength band of 800 to 1400 nm and a wavelength band of 500 to 570 nm.

An eighteenth aspect of the present disclosure is the aspect according to any one of the first to seventeenth aspects, in which a multilayer film on each surface of the spectacle lens includes one or more high refractive index layers and one or more low refractive index layers, and the total number of layers is 8 or less.

A nineteenth aspect of the present disclosure is the aspect according to any one of the first to eighteenth aspects, in which a maximum value in the wavelength band of 800 to 1400 nm (the largest maximum value when there is a plurality of maximum values) is preferably also a maximum value in the wavelength band of 800 to 1400 nm.

A twentieth aspect of the present disclosure is the aspect according to any one of the first to nineteenth aspects, in which a maximum value in the wavelength band of 500 to 570 nm (the largest maximum value when there is a plurality of maximum values) is preferably also a maximum value in the wavelength band of 500 to 570 nm.

Advantageous Effects of Disclosure

According to an embodiment of the present disclosure, IR cut function and low UV reflection on the eyeball-side surface can be ensured.

BRIEF DESCRIPTION OF DRAWINGS

FIG. 2 is a diagram illustrating a transmission spectrum obtained by measurement of the spectacle lens of Example 1.

FIG. 3 is a diagram illustrating spectral reflection spectra obtained by measurements on object-side surfaces and eyeball-side surfaces of spectacle lenses of Example 1 and Reference Examples 1 and 2.

DESCRIPTION OF EMBODIMENTS

Figure 1:
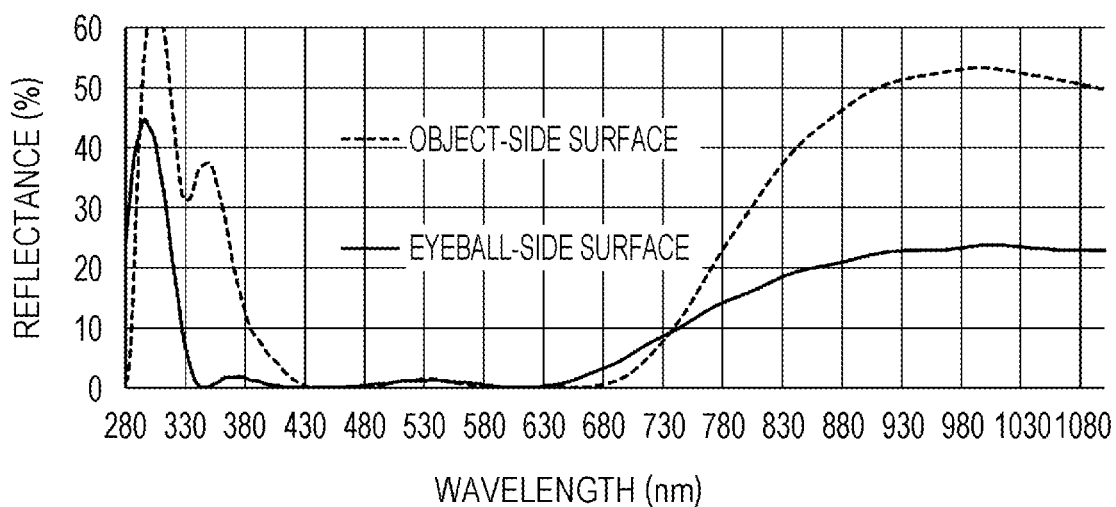
FIGS. 1 to 3 are diagrams illustrating spectral reflection spectra obtained by measurement on an object-side surface and an eyeball-side surface of a spectacle lens of Example 1.

A mean reflectance in the present disclosure and the present specification means an arithmetic mean value of normal incidence reflectances measured for each arbitrary wavelength (with an arbitrary pitch) in a wavelength range to be measured at the optical center of a surface to be measured. For the measurement, a measurement wavelength interval (pitch) can be arbitrarily set in a range of, for example, 1 to 10 nm. A reflection spectral characteristic such as a reflectance in the present disclosure and the present specification means a normal incidence reflection spectral characteristic. "Luminous reflectance" is measured in accordance with JIS T 7334:2011.

In the present disclosure and the present specification, "eyeball-side surface" means a surface disposed on an eyeball side and "object-side surface" means a surface disposed on an object side when a wearer wears spectacles including a spectacle lens.

In the present specification, "to" refers to a predetermined value or more and a predetermined value or less.

Hereinafter, an embodiment of the present disclosure will be described.

[Spectacle Lens According to an Aspect of the Present Disclosure]

A spectacle lens according to an aspect of the present disclosure is
 a spectacle lens including multilayer films on an object-side surface and an eyeball-side surface of a lens substrate, in which
 a reduction ratio of light in a wavelength band of 800 to 1400 nm in the spectacle lens is 45.0% or more,
 a ratio of a mean reflectance on the eyeball-side surface of the spectacle lens to a mean reflectance on the object-side surface of the spectacle lens is 0.2 to 0.8 in the wavelength band, and
 a mean reflectance in a wavelength band of 315 to 400 nm on the eyeball-side surface is 5.0% or less.

First, it is assumed that a reduction ratio of light in a wavelength band of 800 to 1400 nm is set to 45.0% or more when light passes through both surfaces of the spectacle lens, that is, the spectacle lens as a whole has a sufficient IR cut function. The reduction ratio (%) is (100−transmittance value) (%).

Meanwhile, in the wavelength band of 800 to 1400 nm, a ratio of the mean reflectance on the eyeball-side surface of the spectacle lens to the mean reflectance on the object-side surface of the spectacle lens is set to 0.2 to 0.8 (preferably 0.3 (more preferably more than 0.3), more preferably 0.4 (more preferably more than 0.4) as a lower limit, and set to preferably less than 0.6 as an upper limit). That is, while IR cut function is imparted to the multilayer films on both surfaces, the height of IR cut function is intentionally reduced by one step in the multilayer film on the eyeball-side surface. The above ratio indicates this reduction by one-step.

By setting a mean reflectance on the eyeball-side surface in a wavelength band of 315 to 400 nm to 5.0% or less (preferably less than 5.0%, more preferably 4.5% or less), low UV reflection is imparted to the multilayer film on the eyeball-side surface.

According to such an aspect of the present disclosure, IR cut function and low UV reflection on the eyeball-side surface can be ensured.

[Preferable Example of Spectacle Lens According to an Aspect of the Present Disclosure]

Hereinafter, a preferred example of an aspect of the present disclosure will be described, and details of the configuration of the spectacle lens according to an aspect of the present disclosure will be described.

The reflectance on each surface of the spectacle lens preferably has at least one maximum value in a wavelength band of 800 to 1400 nm. This maximum value (the largest maximum value when there is a plurality of maximum values) is also preferably a maximum value in the wavelength band of 800 to 1400 nm. This requirement indicates that IR cut function having the same tendency in a relationship between wavelength and reflectance (for example, when the horizontal axis indicates wavelength (nm) and the vertical axis indicates reflectance (%), plots between wavelength and reflectance draw a convex shape upward when viewed macroscopically) is imparted to the multilayer films on both surfaces. By meeting this requirement, IR cut function is ensured because light in the wavelength band of 800 to 1400 nm is effectively reflected on the multilayer films on both surfaces.

By the way, in order to specify that the plots between wavelength and reflectance macroscopically draw a convex shape upward, a requirement that smoothed plots in the wavelength band of 800 to 1400 nm in the plots between wavelength and reflectance have at least one (for example, one) maximum value may be provided. This smoothing may be performed, for example, by taking a running mean of reflectances at 10 points before and after predetermined point a in the plots (that is, 21 points in total including point a), and using the running mean value as a new reflectance at point a. As a result, it is possible to exclude a case where there is a plurality of maximum values due to fine vibration in the plots, and to specify that the plots between wavelength and reflectance macroscopically draw a convex shape upward.

The reflectance on each surface of the spectacle lens preferably has at least one maximum value in a wavelength band of 500 to 570 nm in addition to the above wavelength band. This requirement indicates that characteristics of the same tendency are imparted to the multilayer films on both surfaces in that green (500 to 570 nm) reflected light (more specifically, interference light) is generated. By meeting this requirement, the accuracy of visual inspection of a spectacle lens can be improved.

More specifically, the visual inspection of a spectacle lens includes an inspection for examining the state of interference light by irradiating the spectacle lens with light. When red or blue interference light is generated instead of green interference light, these colors have a lower visual perception than green light, and therefore the accuracy of the visual inspection is lowered. Meanwhile, when green interference light in a wavelength band of 500 to 570 nm is generated as in the above example, such a risk can be eliminated.

Green reflected light is preferable to a wearer because the green reflected light has a higher psychological affinity than blue reflected light. Therefore, at least one maximum value (the largest maximum value when there is a plurality of maximum values) in the wavelength band of 500 to 570 nm is preferably more than 1.0% (preferably 1.5% or more).

The sum of the luminous reflectances on both surfaces of the spectacle lens is preferably 3.0% or less (preferably less than 3.0%, more preferably 2.5% or less, still more preferably 2.0% or less). According to the above requirement, it is possible to suppress occurrence of glare due to reflected light in the spectacle lens. The luminous reflectance on each surface may be 1.1% or less, or 1.0% or less.

According to an aspect of the present disclosure, the sum of the luminous reflectances on both surfaces of the spectacle lens is 3.0% or less, and one maximum value (largest maximum value) in the wavelength band of 500 to 570 nm may be more than 1.5%. That is, when the luminous reflectance on one surface is about 1.5%, which is half of 3.0%, even though the luminous reflectance on the one surface is 1.5%, one maximum value (largest maximum value) in the green wavelength band of 500 to 570 nm may be more than 1.5%. This makes it possible to generate green interference light at a pinpoint while suppressing the luminous reflectance.

The mean reflectance in a wavelength band of 315 to 380 nm (UVA) on the eyeball-side surface of the spectacle lens may be 5.0% or less. According to this requirement, the mean reflectance in UVA in UV can be suppressed, and therefore low UV reflection can be achieved more reliably. Generally, when high IR cut function is imparted to a multilayer film, UV reflectance (UVA) tends to be high. Meanwhile, in an aspect of the present disclosure, IR cut function on the eyeball-side surface is intentionally reduced by one step. Instead, low UV reflection (UVA) is achieved, and the luminous reflectance is suppressed to a low value.

The mean reflectance in a wavelength band of 315 to 380 nm (UVA) on the object-side surface of the spectacle lens may be 30.0% or more.

The mean reflectance in a wavelength band of 280 to 315 nm (UVB) on the object-side surface of the spectacle lens may be 50.0% or more.

A multilayer film on each surface of the spectacle lens includes one or more high refractive index layers and one or more low refractive index layers, and the total number of layers is 9 or less (preferably 8 or less).

Specific matters other than the above matters will be described below.

[Details of Configuration of Spectacle Lens According to an Aspect of the Present Disclosure]

In the spectacle lens, the multilayer film formed on each of the eyeball-side surface and the object-side surface of the lens substrate can impart the above reflection spectral characteristic to the spectacle lens. The multilayer film is formed on a surface of the lens substrate directly or indirectly through one or more other layers. The lens substrate is not particularly limited, and examples thereof include glass, a styrene resin including a (meth)acrylic resin, a polycarbonate resin, an allyl resin, an allyl carbonate resin such as diethyleneglycol bis(allylcarbonate) resin (CR-39), a vinyl resin, a polyester resin, a polyether resin, a urethane resin obtained through reaction between an isocyanate compound and a hydroxy compound such as diethylene glycol, a thiourethane resin obtained through reaction between an isocyanate compound and a polythiol compound, and a transparent resin obtained by curing a polymerizable composition containing a (thio) epoxy compound having one or more intermolecular disulfide bonds. In addition, inorganic glass can also be used. Note that the lens substrate may be undyed (a colorless lens) or dyed (a dyed lens). The refractive index of the lens substrate is, for example, approximately 1.60 to 1.75. Provided that the refractive index of the lens substrate is not limited thereto but may be within the above range or deviate therefrom.

The spectacle lens can be various lenses such as a monofocal lens, a multifocal lens, and a progressive addition lens. The type of the lens is determined depending on the shapes of both surfaces of the lens substrate. A surface of the lens substrate may be a convex surface, a concave surface, or a flat surface. In a general lens substrate and spectacle lens, the object-side surface is a convex surface, and the eyeball-side surface is a concave surface. However, the present disclosure is not limited thereto.

The multilayer film for imparting the above reflection spectral characteristic may be provided on a surface of the lens substrate directly or indirectly through one or more other layers. Examples of a layer which can be formed between the lens substrate and the multilayer film include a hard coat layer (hereinafter, also referred to as "hard coat"). By forming a hard coat layer, it is possible to impart flaw resistance (abrasion resistance) to the spectacle lens and to improve durability (strength) of the spectacle lens. For details of the hard coat layer, for example, paragraphs 0025 to 0028 and 0030 of JP 2012-128135 A can be referred to. A primer layer may be formed between the lens substrate and the coat in order to enhance adhesion. For details of the primer layer, for example, paragraphs 0029 and 0030 of JP 2012-128135 A can be referred to.

The multilayer film formed on each of the eyeball-side surface and the object-side surface of the lens substrate is not particularly limited as long as the multilayer film can impart the above-described reflection spectral characteristic to the spectacle lens surfaces having the multilayer films. Such a multilayer film can be preferably formed by sequentially building up a high refractive index layer and a low refractive index layer. More specifically, the multilayer film can be formed by determining the film thickness of each layer through optical simulation by a known method based on a refractive index of a film material for forming the high refractive index layer and the low refractive index layer and the wavelength of light to be reflected and light the reflection of which is to be reduced, and then sequentially building up the high refractive index layer and the low refractive index layer under film formation conditions determined such that the determined film thickness is achieved. A film forming material may be an inorganic material, an organic material, or an organic-inorganic composite material, and is preferably an inorganic material from a viewpoint of film formation and ease of availability. By adjusting the type of the film forming material, a film thickness, building order, or the like, it is possible to control the reflection spectral characteristic to each of blue light, ultraviolet rays, green light, and red light.

Examples of a high refractive index material for forming the high refractive index layer include one type of oxide selected from the group consisting of zirconium oxide (for example, $ZrO_2$), tantalum oxide ($Ta_2O_5$), titanium oxide (for example, $TiO_2$), aluminum oxide ($Al_2O_3$), yttrium oxide (for example, $Y_2O_3$), hafnium oxide (for example, $HfO_2$), and niobium oxide (for example, $Nb_2O_5$), and a mixture of two or more types of oxides selected therefrom. Meanwhile, examples of a low refractive index material for forming the low refractive index layer include one type of oxide or fluoride selected from the group consisting of silicon oxide (for example, $SiO_2$), magnesium fluoride (for example, $MgF_2$), and barium fluoride (for example, $BaF_2$), and a mixture of two or more types of oxides and fluorides selected therefrom. Note that in the above examples, oxide and fluoride are expressed in a stoichiometric composition for convenience, but oxide or fluoride in which oxygen or fluorine is deficient or excessive as compared to the stoichiometric composition can also be used as the high refractive index material or the low refractive index material.

The film thickness of each layer included in the multilayer film can be determined through optical simulation as described above. Examples of a layer configuration of the multilayer film include:

a configuration in which a first layer (low refractive index layer), a second layer (high refractive index layer), a third layer (low refractive index layer), a fourth layer (high refractive index layer), a fifth layer (low refractive index layer), a sixth layer (high refractive index layer), and a seventh layer (low refractive index layer) are layered in this order from a lens substrate side to a lens outermost side; and a configuration in which a first layer (high refractive index layer), a second layer (low refractive index layer), a third layer (high refractive index layer), a fourth layer (low refractive index layer), a fifth layer (high refractive index layer), a sixth layer (low refractive index layer), a seventh layer (high refractive index layer), and an eighth layer (low refractive index layer) are layered in this order from the lens substrate side to the lens outermost side. Examples of a preferable combination of a low refractive index layer and a high refractive index layer include a combination of a coat including silicon oxide as a principal component and a coat including zirconium oxide as a principal component, and a combination of a coat including silicon oxide as a principal component and a coat including niobium oxide as a principal component. Preferable examples of the multilayer film include a multilayer film including at least one stack in which these two coats are adjacent to each other.

Each of the layers is preferably a coat including the above-described high refractive index material or low refractive index material as a principal component. Here, the principal component is a component which accounts for the largest part of the coat and generally accounts for approximately 50 to 100% by mass, or furthermore 90 to 100% by mass with respect to the total amount. Such a coat can be formed by film formation using a film forming material including the above material as a principal component (for example, a vapor deposition source). Note that the principal component of the film forming material is similar to the above. The coat and the film forming material may include a minute amount of impurities which are inevitably mixed, and may include another component such as another inorganic substance or a known additive component which supports film formation as long as the component does not impair the function of the principal component. The film formation can be performed by a known film formation method, and is preferably performed by vapor deposition from a viewpoint of ease of the film formation. The vapor deposition in the present disclosure includes a dry method such as a vacuum vapor deposition method, an ion plating method, or a sputtering method. In the vacuum vapor deposition method, an ion beam assist method for emitting an ion beam simultaneously with vapor deposition may be used.

The multilayer film can also include, in addition to the above-described high refractive index layer and low refractive index layer, a coat including a conductive oxide as a principal component, preferably one or more conductive oxide layers formed by vapor deposition using a vapor deposition source including a conductive oxide as a principal component at an arbitrary position in the multilayer film. As the conductive oxide, various conductive oxides generally known as transparent conductive oxides, such as indium oxide, tin oxide, zinc oxide, titanium oxide, or composite oxide thereof, are preferably used from a viewpoint of transparency of the spectacle lens. Particularly preferable examples of the conductive oxide include tin oxide and indium-tin oxide (ITO) from viewpoints of transparency and conductivity. By including the conductive oxide layer, it is possible to prevent adherence of dust to the charged spectacle lens.

A functional film can be further formed on the multilayer film. Examples of such a functional film include various functional films such as a water repellent or hydrophilic antifouling film, an anti-fogging film, a polarizing film, and a photochromic film. A known technique can be applied to any of these functional films without any restriction.

[Spectacles According to an Aspect of the Present Disclosure]

According to another aspect of the present disclosure, it is possible to provide spectacles including the above spectacle lens according to an aspect of the present disclosure and a frame equipped with the spectacle lens. The spectacle lens has been described above in detail. A known technique can be applied to other components of the spectacles without any restriction.

[Method for Manufacturing Spectacle Lens According to an Aspect of the Present Disclosure]

According to another aspect of the present disclosure, it is also possible to provide a method for manufacturing the above spectacle lens according to an aspect of the present disclosure.

EXAMPLES

The present disclosure will be further described with Examples below, but the present disclosure is not limited to aspects described in the Examples. In the following description, the refractive index is a refractive index at a wavelength of 500 nm.

Example 1

On a hard coat surface on a convex surface side (object side) of a plastic lens substrate (trade name: EYAS manufactured by HOYA Corporation, refractive index: 1.60, colorless lens) in which both surfaces had been optically finished and subjected to hard coating in advance, the object-side surface was a convex surface, and the eyeball-side surface was a concave surface, a multilayer vapor deposition film having eight layers in total was sequentially formed by ion assisted deposition using an oxygen gas ($O_2$) and an argon gas (Ar) as assist gases.

On the hard coat surface on the concave surface side (eyeball side), a multilayer vapor deposition film having seven layers in total was also layered by the ion assisted deposition under similar conditions, and a spectacle lens was thus obtained.

In the present Example, the multilayer vapor deposition film was formed such that, on each side of the convex surface side and the concave surface side, a first layer, a second layer . . . were layered in this order from the lens substrate side (hard coat side) to the spectacle lens surface and the outermost layer on the spectacle lens surface side was to be an eighth layer using any of the vapor deposition sources illustrated in Table 1. In the present Example, the vapor deposition sources formed of the following oxides were used except for impurities which may be inevitably mixed. In the present Example, the reflection spectral characteristic was controlled by changing the film thicknesses of the following one or more layers.

Table 1 below illustrates the physical film thickness and the optical film thickness of the multilayer film on each of the object-side surface and the eyeball-side surface in addition to the vapor deposition source.

TABLE 1

| | | | Object-side surface | | Eyeball-side surface | |
|---|---|---|---|---|---|---|
| | Vapor deposition source | Refractive index | Physical film thickness (nm) | Optical film thickness (nm) | Physical film thickness (nm) | Optical film thickness (nm) |
| First layer | $Nb_2O_5$ | 2.39 | 6.52 | 0.12 | 7.29 | 0.14 |
| Second layer | $SiO_2$ | 1.47 | 219.56 | 2.58 | 47.42 | 0.56 |
| Third layer | $Nb_2O_5$ | 2.39 | 11.96 | 0.23 | 6.78 | 0.13 |
| Fourth layer | $SiO_2$ | 1.47 | 19.94 | 0.23 | 145.35 | 1.71 |
| Fifth layer | $Nb_2O_5$ | 2.39 | 91.92 | 1.76 | 11.69 | 0.22 |
| Sixth layer | $SiO_2$ | 1.47 | 172.02 | 2.02 | 18.36 | 0.22 |
| Seventh layer | $Nb_2O_5$ | 2.39 | 94.76 | 1.81 | 90.81 | 1.74 |
| Eighth layer | $SiO_2$ | 1.47 | 64.26 | 0.76 | 73.50 | 0.86 |

In the optical center of each of the object-side surface (convex surface side) and the eyeball-side surface (concave surface side) of the spectacle lens of the present Example, a spectroscopic reflection spectrum and a transmission spectrum in a wavelength range of 280 to 1400 nm were measured (measurement pitch: 1 nm) using a spectrophotometer F10-AR manufactured by Filmetrics and a Hitachi spectroaltimeter U-4100 in combination. In order to suppress reflection from a non-measurement surface, the non-measurement surface was painted with lusterless black as described in Section 5.2 of JIS T 7334.

FIG. 1 is a diagram illustrating spectral reflection spectra obtained by measurement on the object-side surface and the eyeball-side surface of the spectacle lens of Example 1.

Figure 2:
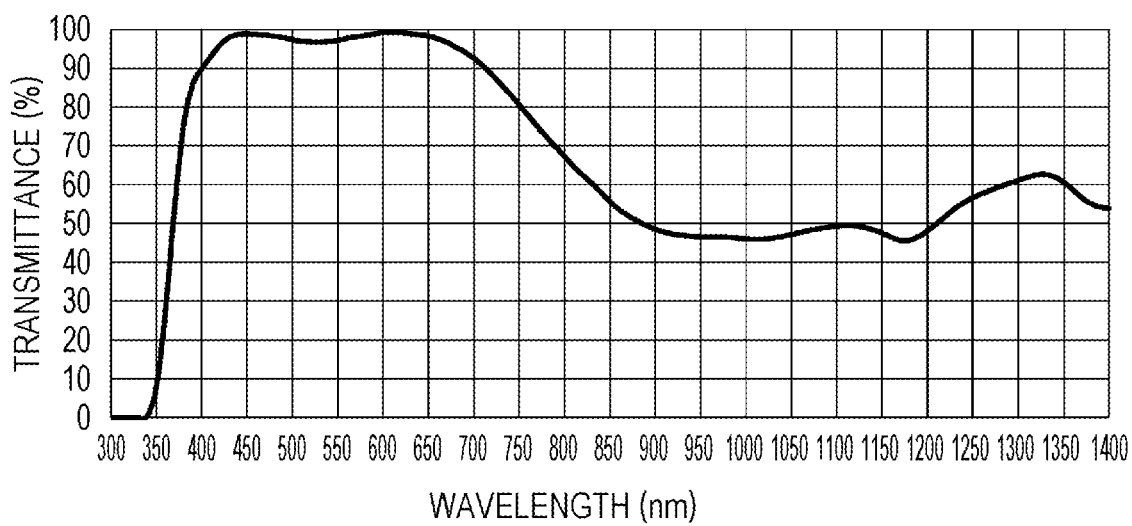

FIG. 2 is a diagram illustrating a transmission spectrum obtained by measuring the spectacle lens of Example 1.

In the present Example, as illustrated in FIG. 2, the condition that the reduction ratio of light in the wavelength band of 800 to 1400 nm is 45.0% or more in the spectacle lens according to an aspect of the present disclosure is clearly satisfied (accurate value is 47.9%). In addition, as illustrated in FIG. 1, the condition that the ratio of a mean reflectance on the eyeball-side surface of the spectacle lens to a mean reflectance on the object-side surface of the spectacle lens is 0.2 to 0.8 in the wavelength band of 800 to 1400 nm in the spectacle lens according to an aspect of the present disclosure is satisfied.

In addition, the condition that a mean reflectance on the eyeball-side surface in a wavelength band of 315 to 400 nm is 5.0% or less is also satisfied (accurate value is 4.68%). Furthermore, the sum of luminous reflectances on both surfaces in the optical multilayer film at this time is 1.95% (1.04% on the object-side surface and 0.91% on the eyeball-side surface). This indicates that reflection is sufficiently suppressed on both surfaces, and a favorable wearing feeling is achieved as the spectacle lens.

Reference Example 1

In the present Example, the ratio of a mean reflectance on the eyeball-side surface of the spectacle lens to a mean reflectance on the object-side surface of the spectacle lens was set to 0.18 in a wavelength band of 800 to 1400 nm. Reference Example 1 was performed in a similar manner to Example 1 except for this.

Table 2 below illustrates the physical film thickness and the optical film thickness of the multilayer film on each of the object-side surface and the eyeball-side surface in addition to the vapor deposition sources for the present Example and Reference Example 2 below.

TABLE 2

| | Vapor deposition source | Refractive index | Eyeball-side surface in Reference Example 1 | | Eyeball-side surface in Reference Example 2 | |
|---|---|---|---|---|---|---|
| | | | Physical film thickness (nm) | Optical film thickness (nm) | Physical film thickness (nm) | Optical film thickness (nm) |
| First layer | $Nb_2O_5$ | 2.39 | 9.21 | 0.18 | 15.93 | 0.30 |
| Second layer | $SiO_2$ | 1.47 | 78.55 | 0.92 | 46.73 | 0.55 |
| Third layer | $Nb_2O_5$ | 2.39 | 14.63 | 0.28 | 32.90 | 0.63 |
| Fourth layer | $SiO_2$ | 1.47 | 63.84 | 0.75 | 40.36 | 0.47 |
| Fifth layer | $Nb_2O_5$ | 2.39 | 36.47 | 0.70 | 125.02 | 2.39 |
| Sixth layer | $SiO_2$ | 1.47 | 33.55 | 0.39 | 173.24 | 2.04 |
| Seventh layer | $Nb_2O_5$ | 2.39 | 34.31 | 0.66 | 106.02 | 2.03 |
| Eighth layer | $SiO_2$ | 1.47 | 101.27 | 1.19 | 92.76 | 1.09 |

Reference Example 2

In the present Example, the ratio of a mean reflectance on the eyeball-side surface of the spectacle lens to a mean reflectance on the object-side surface of the spectacle lens was set to 0.82 in a wavelength band of 800 to 1400 nm. Reference Example 2 was performed in a similar manner to Example 1 except for this.

Example 2

In the present Example, the ratio of a mean reflectance on the eyeball-side surface of the spectacle lens to a mean reflectance on the object-side surface of the spectacle lens was set to 0.32 in a wavelength band of 800 to 1400 nm. Example 2 was performed in a similar manner to Example 1 except for this.

Example 3

In the present Example, the ratio of a mean reflectance on the eyeball-side surface of the spectacle lens to a mean reflectance on the object-side surface of the spectacle lens was set to 0.42 in a wavelength band of 800 to 1400 nm. Example 3 was performed in a similar manner to Example 1 except for this.

Example 4

In the present Example, the ratio of a mean reflectance on the eyeball-side surface of the spectacle lens to a mean reflectance on the object-side surface of the spectacle lens was set to 0.52 in a wavelength band of 800 to 1400 nm. Example 4 was performed in a similar manner to Example 1 except for this.

Figure 3:
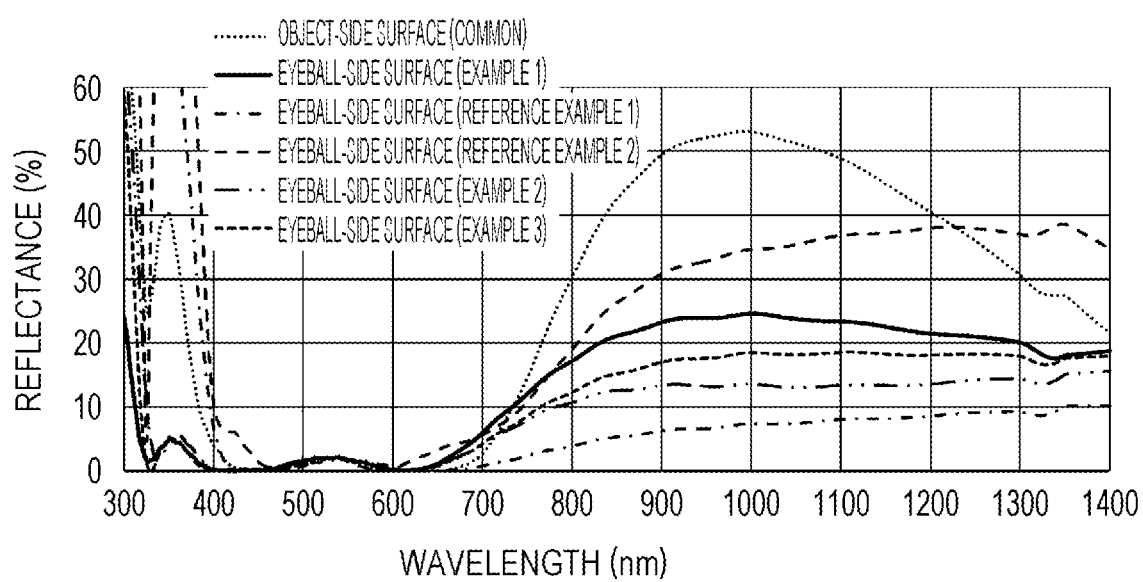

FIG. 3 is a diagram illustrating spectral reflection spectra obtained by measurements on object-side surfaces and eyeball-side surfaces of spectacle lenses of Examples 1 to 3 and Reference Examples 1 and 2.

In Reference Examples 1 and 2, as illustrated in FIG. 3, low UV reflection on the eyeball-side surface could not be ensured. Meanwhile, in Examples 1 to 3, as illustrated in FIG. 3, low UV reflection on the eyeball-side surface could be ensured, and favorable IR cut performance could be exhibited. Although Example 4 is not illustrated in FIG. 3, the mean reflectance on the eyeball-side surface in a wavelength band of 800 to 1400 nm was 21.1%, and the mean reflectance in a wavelength band of 315 to 400 nm was 3.49%. Therefore, low UV reflection on the eyeball-side surface could be ensured while favorable IR cut performance was exhibited.

The embodiment disclosed herein is an example in every respect and should not be restrictively understood. The scope of the present disclosure is described not by the above description but by claims, and includes all modifications equivalent to and in claims.

The present disclosure is useful in the field of manufacturing a spectacle lens and spectacles.

The invention claimed is:

1. A spectacle lens comprising:
a lens substrate having an object-side surface and an eyeball-side surface, the lens substrate comprising:
a first multilayer film on the object-side surface, and
a second multilayer film on the eyeball-side surface, wherein
a reduction ratio of light in a wavelength band of 800 to 1400 nm in the lens substrate is 45.0% or more,
a ratio of a mean reflectance on the eyeball-side surface of the lens substrate to a mean reflectance on the object-side surface of the lens substrate is 0.2 to 0.8 in the wavelength band, and
a mean reflectance on the eyeball-side surface of the lens substrate in a wavelength band of 315 to 400 nm is 5.0% or less,
the first multilayer film and the second multilayer film each include one or more high refractive index layers and one or more low refractive index layers sequentially built up, and a total number of the high refractive index layers and the low refractive index layers in each of the first multilayer film and the second multilayer film is 9 or less, and
a sum of luminous reflectance on both surfaces of the lens substrate is 3.0% or less.

2. The spectacle lens according to claim 1, wherein the ratio of the mean reflectance is less than 0.6.

3. The spectacle lens according to claim 1, wherein the reflectance on each surface of the lens substrate has at least one maximum value in the wavelength band of 800 to 1400 nm.

4. The spectacle lens according to claim 1, wherein the reflectance on each surface of the lens substrate has at least one maximum value in a wavelength band of 500 to 570 nm.

5. The spectacle lens according to claim 4, wherein the largest maximum value in the wavelength band of 500 to 570 nm is more than 1.5%.

6. The spectacle lens according to claim 1, wherein the mean reflectance on the eyeball-side surface of the lens substrate in a wavelength band of 315 to 380 nm is 5.0% or less.

7. The spectacle lens according to claim 1, wherein the mean reflectance on the object-side surface of the lens substrate in a wavelength band of 315 to 380 nm is 30.0% or more.

8. The spectacle lens according to claim 1, wherein the mean reflectance on the object-side surface of the lens substrate in a wavelength band of 280 to 315 nm is 50.0% or more.

9. The spectacle lens according to claim 1, wherein the high refractive index layer includes one type of oxide selected from the group consisting of zirconium oxide, tantalum oxide, titanium oxide, aluminum oxide, yttrium oxide, hafnium oxide, and niobium oxide, and a mixture of two or more types of oxides selected therefrom.

10. The spectacle lens according to claim 1, wherein the low refractive index layer includes one type of oxide or fluoride selected from the group consisting of silicon oxide, magnesium fluoride, and barium fluoride, and a mixture of two or more types of oxides and fluorides selected therefrom.

11. The spectacle lens according to claim 9, wherein the low refractive index layer includes one type of oxide or fluoride selected from the group consisting of silicon oxide, magnesium fluoride, and barium fluoride, and a mixture of two or more types of oxides and fluorides selected therefrom.

12. The spectacle lens according to claim 2, wherein the high refractive index layer includes one type of oxide selected from the group consisting of zirconium oxide, tantalum oxide, titanium oxide, aluminum oxide, yttrium oxide, hafnium oxide, and niobium oxide, and a mixture of two or more types of oxides selected therefrom.

13. The spectacle lens according to claim 12, wherein the low refractive index layer includes one type of oxide or fluoride selected from the group consisting of silicon oxide, magnesium fluoride, and barium fluoride, and a mixture of two or more types of oxides and fluorides selected therefrom.

14. The spectacle lens according to claim 3, wherein the high refractive index layer includes one type of oxide selected from the group consisting of zirconium oxide, tantalum oxide, titanium oxide, aluminum oxide, yttrium oxide, hafnium oxide, and niobium oxide, and a mixture of two or more types of oxides selected therefrom.

15. The spectacle lens according to claim 14, wherein the low refractive index layer includes one type of oxide or fluoride selected from the group consisting of silicon oxide, magnesium fluoride, and barium fluoride, and a mixture of two or more types of oxides and fluorides selected therefrom.

16. The spectacle lens according to claim 4, wherein the high refractive index layer includes one type of oxide selected from the group consisting of zirconium oxide, tantalum oxide, titanium oxide, aluminum oxide, yttrium oxide, hafnium oxide, and niobium oxide, and a mixture of two or more types of oxides selected therefrom.

17. The spectacle lens according to claim 16, wherein the low refractive index layer includes one type of oxide or fluoride selected from the group consisting of silicon oxide, magnesium fluoride, and barium fluoride, and a mixture of two or more types of oxides and fluorides selected therefrom.

18. The spectacle lens according to claim 6, wherein the high refractive index layer includes one type of oxide selected from the group consisting of zirconium oxide, tantalum oxide, titanium oxide, aluminum oxide, yttrium oxide, hafnium oxide, and niobium oxide, and a mixture of two or more types of oxides selected therefrom, and
the low refractive index layer includes one type of oxide or fluoride selected from the group consisting of silicon oxide, magnesium fluoride, and barium fluoride, and a mixture of two or more types of oxides and fluorides selected therefrom.

\* \* \* \* \*